US008839335B2

(12) United States Patent
Ha

(10) Patent No.: US 8,839,335 B2
(45) Date of Patent: Sep. 16, 2014

(54) METHOD OF PROCESSING MULTI-MODE SERVICE BROADCAST SIGNAL AND DIGITAL TELEVISION RECEIVER USING THE SAME

(75) Inventor: Kwang Hee Ha, Gyeongsangbuk-do (KR)

(73) Assignee: LG Electronics Inc., Seoul (KR)

( * ) Notice: Subject to any disclaimer, the term of this patent is extended or adjusted under 35 U.S.C. 154(b) by 792 days.

(21) Appl. No.: 13/062,581

(22) PCT Filed: Dec. 8, 2008

(86) PCT No.: PCT/KR2008/007248
§ 371 (c)(1),
(2), (4) Date: Apr. 8, 2011

(87) PCT Pub. No.: WO2010/027126
PCT Pub. Date: Mar. 11, 2010

(65) Prior Publication Data
US 2011/0181782 A1    Jul. 28, 2011

(30) Foreign Application Priority Data

Sep. 8, 2008  (KR) .......................... 10-2008-0088358

(51) Int. Cl.
| | |
|---|---|
| H04N 5/50 | (2006.01) |
| H04N 21/2365 | (2011.01) |
| H04N 21/434 | (2011.01) |
| H04N 21/218 | (2011.01) |
| H04N 21/482 | (2011.01) |
| H04N 5/45 | (2011.01) |
| H04N 5/445 | (2011.01) |

(52) U.S. Cl.
CPC ....... *H04N 5/44591* (2013.01); *H04N 21/2365* (2013.01); *H04N 21/4347* (2013.01); *H04N 21/21805* (2013.01); *H04N 21/482* (2013.01); *H04N 5/45* (2013.01)

USPC ........................................... 725/131; 725/151

(58) Field of Classification Search
USPC .......................................................... 348/385
See application file for complete search history.

(56) References Cited

U.S. PATENT DOCUMENTS

| | | | | |
|---|---|---|---|---|
| 5,659,353 A | * | 8/1997 | Kostreski et al. | 348/21 |
| 5,729,825 A | * | 3/1998 | Kostreski et al. | 725/62 |

(Continued)

FOREIGN PATENT DOCUMENTS

| | | | | |
|---|---|---|---|---|
| CN | 101150676 A | | 3/2008 | |
| CN | 101207781 | * | 6/2008 | H04H 60/35 |

(Continued)

OTHER PUBLICATIONS

Chinese Office Action dated Feb. 4, 2013 issued in Application No. 200880131658.9 (with English translation).

(Continued)

*Primary Examiner* — Sath V Perungavoor
*Assistant Examiner* — Howard D Brown, Jr.
(74) *Attorney, Agent, or Firm* — KED & Associates, LLP

(57) ABSTRACT

A method of processing a multi-mode service (MMS) broadcast signal in a digital television receiver facilitates the selection of logical channels of a received MMS broadcast according to user preference. The method includes steps of receiving a transport stream corresponding to a selected channel; extracting side information from the received transport stream; determining, based on the extracted side information, whether the selected channel is an MMS broadcast channel broadcasting a primary broadcast program, the MMS broadcast channel including a single physical channel accompanied by a plurality of logical channels configured with the single physical channel, each logical channel transmitting a different programming attribute of the primary broadcast program; and displaying information on the plurality of logical channels, if it is determined that the selected channel is an MMS broadcast channel.

23 Claims, 7 Drawing Sheets

(56) References Cited

U.S. PATENT DOCUMENTS

| | | | |
|---|---|---|---|
| 5,734,589 A * | 3/1998 | Kostreski et al. | 715/716 |
| 6,005,605 A * | 12/1999 | Kostreski et al. | 348/21 |
| 6,778,559 B2 * | 8/2004 | Hyakutake | 370/486 |
| 6,788,709 B1 * | 9/2004 | Hyakutake | 370/486 |
| 6,915,528 B1 * | 7/2005 | McKenna, Jr. | 725/37 |
| 6,970,127 B2 * | 11/2005 | Rakib | 341/173 |
| 7,150,032 B1 * | 12/2006 | Sadanaka et al. | 725/80 |
| 7,373,431 B2 * | 5/2008 | Kondo | 710/2 |
| 8,081,870 B2 * | 12/2011 | Ito et al. | 386/278 |
| 8,255,588 B2 * | 8/2012 | Kondo | 710/17 |
| 8,413,194 B2 * | 4/2013 | Song et al. | 725/62 |
| 8,422,866 B2 * | 4/2013 | Ohbitsu | 386/264 |
| 8,699,864 B2 * | 4/2014 | Owashi et al. | 386/353 |
| 2011/0142072 A1 * | 6/2011 | Song et al. | 370/474 |

FOREIGN PATENT DOCUMENTS

| | | |
|---|---|---|
| CN | 101207781 A | 6/2008 |
| EP | 1 936 961 A2 | 6/2008 |
| KR | 10-2003-0010561 A | 2/2003 |
| KR | 10-0793757 B1 | 1/2008 |
| KR | 10-2008-0023409 A | 3/2008 |
| KR | 10-2008-0027088 A | 3/2008 |
| KR | 10-2008-0064264 A | 7/2008 |
| WO | WO 2008/032913 A1 | 3/2008 |

OTHER PUBLICATIONS

Dream-Multimedia: "User Manual for Dreambox DM 800 HD PVR" (Full German Text); Sep. 6, 2008, Retrieved from the Internet on Feb. 9, 2012 URL: http://61.129.51.85/f1/20080906/16/Manual1_DM800_HD_PVR.PDF; XP-55018889.

European Search Report dated May 16, 2012 issued in Application No. 08 87 6883.

PCT International Search Report dated Feb. 27, 2009 issued in Application No. PCT/KR2008/007248.

* cited by examiner

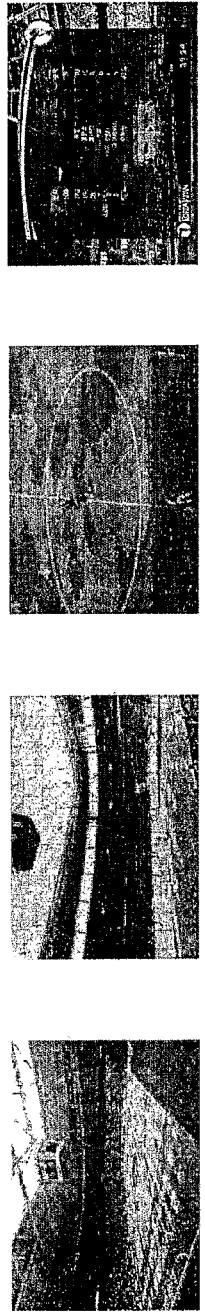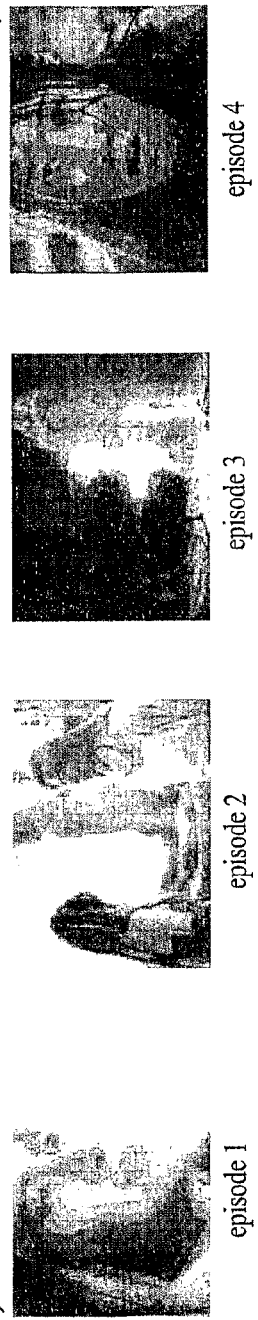
FIG. 2A
FIG. 2B
FIG. 2C

METHOD OF PROCESSING MULTI-MODE SERVICE BROADCAST SIGNAL AND DIGITAL TELEVISION RECEIVER USING THE SAME

TECHNICAL FIELD

The present invention relates to digital television receivers, and more particularly, to a method of processing a broadcast signal in a digital television receiver and a digital television receiver using the same. Although the present invention is suitable for a wide scope of applications, it is particularly suitable for processing a multi-mode service (MMS) broadcast signal in a digital television receiver.

BACKGROUND ART

To increase the efficiency in usage of assigned frequencies in a digital broadcasting environment, a single-channel frequency band is assigned by granting multiple logical channel numbers to a single physical channel. In doing so, the is number of channels providing services can be increased so that a number of different broadcasts, such as recorded programs or live events, can be simultaneously transmitted via several different logical channels belonging to the same physical channel.

Recently, there have arisen various methods for providing a more active viewing environment in a channel receiving system such as a television receiver. Ongoing efforts include methods for a broadcasting service provider to provide a multi-mode service (MMS) whereby the same program or event (i.e., content) is recorded and broadcasted in a user-specific way. MMS broadcasting utilizes digital broadcasting and a single frequency-assigned physical channel to transmit content via more than one logical channel. That is, in MMS broadcasting, a plurality of logical channels is used in conjunction with one physical channel, to enable each viewer to select and view the content as desired.

As multi-mode service has been introduced to the digital broadcasting environment, however, conventional MMS broadcasting has thus far provided only means for transmitting more content using more channels. In particular, functions of the logical channels are currently focusing on transmitting different (i.e., additional) broadcast programs on the corresponding logical channels, respectively, without considering the service from the perspective of the user (i.e., the viewer) in terms of user convenience or viewing satisfaction.

In other words, the advent of logical channels in addition to a corresponding physical channel has merely served to secure additional channels for a broadcaster's use in the traditional way, such that a contemporary digital television receiver still receives a different broadcast on a different channel. Therefore, there is a need for a method of providing for the reception and processing of an MMS broadcast signal by a digital television receiver enabling an active viewing environment that is more user-specific and that enhances user convenience and the viewing experience.

DISCLOSURE OF INVENTION

Accordingly, the present invention is directed to a method of processing an multi-mode service (MMS) broadcast signal and digital television receiver using the same that substantially obviates one or more problems due to limitations and disadvantages of the related art.

An object of the present invention is to provide a method of processing an MMS broadcast signal in a digital television receiver, which uses a multi-mode service capable of simultaneously transmitting on several logical channels belonging to a single physical channel, to efficiently provide a viewer with a primary broadcast program according to various attributes of programming.

Another object of the present invention is to provide a method of processing an MMS broadcast signal in a digital television receiver, which facilitates the selection of logical channels of a received MMS broadcast signal according to user preference.

Another object of the present invention is to provide a digital television receiver suitable for use with the method of the present invention.

Another object of the present invention is to provide an MMS broadcasting system suitable for use with the method of the present invention.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages in accordance with the purpose of the invention, as embodied and broadly described herein, there is provided a method of processing a multi-mode service (MMS) broadcast signal in a digital television receiver. The method comprises steps of receiving a transport stream corresponding to a selected channel; extracting side information from the received transport stream; determining, based on the extracted side information, whether the selected channel is an MMS broadcast channel broadcasting a primary broadcast program, the MMS broadcast channel including a single physical channel accompanied by a plurality of logical channels configured with the single physical channel, each logical channel transmitting a different programming attribute of the primary broadcast program; and displaying information on the plurality of logical channels, if it is determined that the selected channel is an MMS broadcast channel.

According to another aspect of the present invention, there is provided a digital television receiver comprising a tuner for receiving a transport stream corresponding to a selected channel; a controller for extracting side information from the received transport stream and for determining, based on the extracted side information, whether the selected channel is an MMS broadcast channel broadcasting a primary broadcast program, the MMS broadcast channel including a single physical channel accompanied by a plurality of logical channels configured with the single physical channel, each logical channel transmitting a different programming attribute of the primary broadcast program; and a display module for displaying information on the plurality of logical channels, if it is determined that the selected channel is an MMS broadcast channel.

According to another aspect of the present invention, there is provided a multi-mode service (MMS) broadcasting system comprising a transmitter side and a receiver side. The transmitter side is configured to provide a multi-mode service by multiplexing a television broadcast signal including a plurality of broadcast programs based on a primary broadcast program, each broadcast program of the plurality of broadcast programs exhibiting a different programming attribute. The transmitter side inserts into the multiplexed signal a predetermined flag indicating the multi-mode service and transmits the multiplexed signal via an MMS broadcast channel including a single physical channel accompanied by a plurality of logical channels configured with the single physical channel, each logical channel carrying a corresponding one of the different programming attributes of the primary broadcast program. The receiver side, which receives the multiplexed signal from the transmitter side, comprises a tuner for receiving a transport stream corresponding to a selected channel; a controller for extracting side information from the received transport stream and for determining, based on the extracted side information, whether the selected channel is a channel broadcasting a multi-mode service; and a display module for displaying information on the plurality of logical channels, if it is determined that the selected channel is a channel broadcasting a multi-mode service.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this specification, illustrate embodiment(s) of the invention and together with the description serve to explain the principles of the invention. In the drawings:

FIG. 2A is a set of exemplary screen images displayed according to a user selection of one of a plurality of logical channels, respectively, each screen image showing the same primary program from a different camera angle;

FIG. 2B is a set of exemplary screen images displayed according to a user selection of one of a plurality of logical channels, respectively, each screen image showing the same primary program at a different image property;

FIG. 2C is a set of exemplary screen images displayed according to a user selection of one of a plurality of logical channels, respectively, each screen image showing a different episode of one recorded program;

BEST MODE FOR CARRYING OUT THE INVENTION

Figure 1:
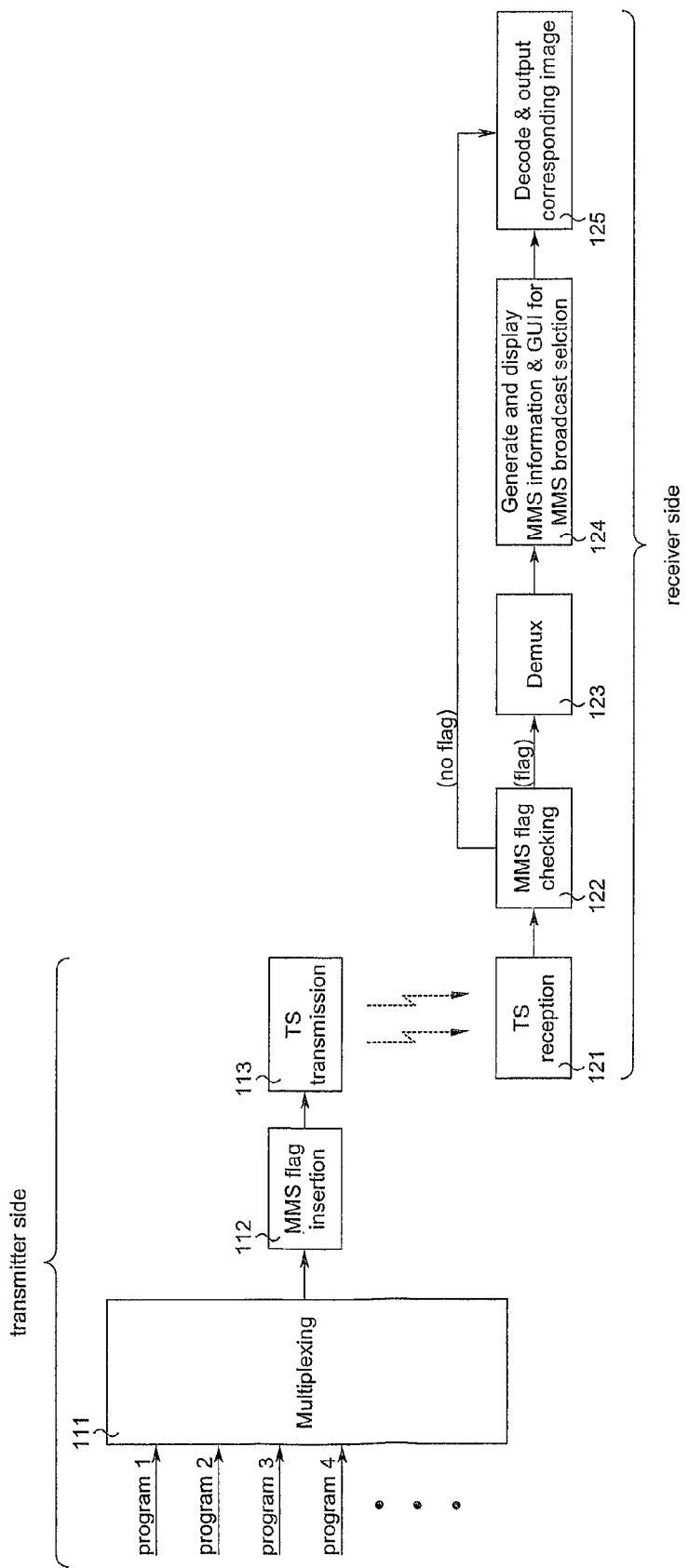
FIG. 1 is a block diagram of an MMS broadcasting system according to the present invention.

According to the present invention, a multi-mode service provider broadcasts via a single physical channel accompanied by a plurality of logical channels. In establishing this service, a transmitting side configures a primary broadcast program as a plurality of associated-content programs, each having a different programming attribute and simultaneously transmitted to a receiving side via a plurality of logical channels, respectively, where all the logical channel belong to the same physical channel, i.e., a channel of a single frequency band. Thus, a single broadcast program is rendered as an associated-content broadcast signal including a plurality of programs having the different programming attributes, respectively, by configuring the logical channels such that a different programming attribute of the primary broadcast program is assigned to each logical channel of the plurality of logical channels, or that one such logical channel is allocated for each attribute. In other words, among the several associated-content programs, every program is shown according to one particular attribute for variously programming the primary broadcast program.

To indicate to a receiving side that the single broadcast program is rendered as above, namely, as a multi-mode service (MMS) broadcast, the transmitting side transmits tag information indicating the use of a multi-mode service according to the present invention. The receiving side detects the tag information and displays information ("MMS information") enabling a user to recognize the presence of the multi-mode service, where the displayed information may further include logical channel-specific information enabling the user to discern the various programming attributes according to logical channel. The receiving side also displays representative images of the logical channels to enable the user to select a program of a channel carrying a specific programming attribute from among the plurality of logical channels carrying the same primary program.

Preferably, a flag indicating the presence (transmission) of a broadcast of a multi-mode service is included in an event information table (EIT) and/or a virtual channel table (VCT) of the side information of the primary broadcast signal. Here, the side information, or additional information, may be comprised of program specific information (PSI) data, program and system information protocol (PSIP) data, or other additional information included in the transport stream that is received and decoded at the receiving side.

Preferably, a broadcasting station provides content exhibiting a variety of programming attributes configured from a signal broadcast program (primary content) into a plurality of logical channels belonging to a physical channel. Being thus configured according to programming attribute, the logical channels 11-1, 11-2, etc. provide the same broadcast program exhibiting various programming attributes, such as views from differently photographed angles provided by cameras respectively disposed at different locations, the same broadcast program exhibiting various image qualities, or different episodes of a series broadcast program.

Preferably, a logical channel skip function is provided. According to this function, which is typically for use in conjunction with (i.e., after executing) an automatic channel search function, a manual channel shifting operation (i.e., the manipulation of a channel number increment/decrement key) causes a currently selected channel to be shifted directly to another physical channel, even though there may be a number of logical channels present. That is, the logical channels belonging to each physical channel are skipped. For instance, for a case where channels 10, 11-1, 11-2, 11-3, 11-4, and 12 are present, a manual channel shift operation produces a sequential channel selection of channel 10, then channel 11-1, and then channel 12, thereby skipping the logical channels 11-2, 11-3, and 11-4 belonging to the corresponding physical channel, i.e., channel 11.

Preferably, a logical channel lock function is provided. According to this function, the manipulation of a channel number increment/decrement key to perform manual channel shifting results in channel selection among logical channels only, e.g., channels 11-1 to 11-4, based on the currently selected physical channel. This function may be used on conjunction with a logical channel search function.

Reference will now be made in detail to preferred embodiments of the present invention, examples of which are illustrated in the accompanying drawings.

FIG. 1 illustrates a multi-mode service (MMS) broadcasting system according to the present invention. As shown, the MMS broadcasting system includes models of a transmitter side (e.g., a broadcasting station) and a receiver side (e.g., a television receiver) according to the present invention. Such a broadcasting station is a multi-mode service provider, and the television receiver is a digital television receiver for receiving the transmitted multi-mode service signal, i.e., the MMS broadcast signal, to be processed according to the present invention.

Referring to FIG. 1, in order to use a multi-mode service, a broadcasting station multiplexes (111) a single primary broadcast program (e.g., program 1) with other broadcast programs (e.g., programs 2-4) commonly associated with the content of the primary broadcast program but having different programming attributes. Thus, all the logical channels of the present invention, including each channel belonging to the physical channel used by the broadcasting station to provide the multi-mode service, exhibit a specific correlation with each other based on the different programming attributes. To indicate the presence of such a configuration of programs in the broadcast signal, the broadcasting station inserts (112) into the multiplexed signal a predetermined flag indicating a multi-mode service, i.e., an "MMS" flag. An MMS broadcast signal, i.e., a transport stream (TS), including the multiplexed broadcast programs and the MMS flag, is then transmitted (113). In particular, the primary broadcast program among the multiplexed broadcast programs is transmitted via a corresponding single physical channel, e.g., channel 11, while the other broadcast programs are transmitted using virtual channels belonging to the physical channel, i.e., logical channels such as channels 11-1, 11-2, etc.

Thereafter, according to a channel selection made by a user, a receiver side receives (121) the transport stream of a channel corresponding to any one of the multiplexed broadcast programs, that is, a digital broadcast signal using the multi-mode service as above. In response to the channel selection, the receiver side extracts side information from the received transport stream and, based on the extracted side information, checks (122) for the presence of a multi-channel broadcast flag, namely, the MMS flag. Thus, the side information is extracted for a currently selected channel by checking for the flag in response to each channel selection made by the user. If the flag is present in the received stream, the receiver side demultiplexes (123) the transport stream and then generates and displays (124) an on-screen display (OSD) signal for providing the user with MMS information. The receiver side may further display a graphical user interface (GUI) screen enabling a user to select one program among the multiplexed broadcast programs, by selecting a specific logical channel belonging to the physical channel carrying the MMS broadcast signal. The GUI display screen is generated using the side information included in the transport stream, and the side information includes information on each logical channel corresponding to the multiplexed broadcast programs. In this case, this logical channel-specific information, which may be included in the display of the MMS information, is displayed based on the extracted side information, that is, based on a currently selected and received channel, and includes an indication of the multi-mode service, the number of logical channels, and the respective programming attributes according to logical channel. Meanwhile, the GUI screen, which is displayed in response to a logical channel preview request (discussed below) and includes a simultaneous display of several representative images corresponding to broadcast programs of a physical channel (e.g., channel 11) accompanied by a plurality of logical channels (e.g., channels 11-1, 11-2, etc.) belonging to the physical channel, and based on the displayed representative images, the user may select a specific logical channel. Then, the receiver side decodes and displays (125) the signal corresponding to the selected channel, so that the image of the selected channel may replace that of a previously selected channel and thereby fill the whole screen.

FIGS. 2A-2C each show a set of exemplary screen images, which are respectively displayed on a whole screen according to a user selection of a plurality of logical channels configured according to the present invention. In FIG. 2A, the user may select one of four cameras, and each screen image shows a corresponding programming attribute of the multiplexed broadcast programs based on a different camera source of a single primary broadcast program, including a scene or scenes photographed from a different camera or camera angle. In FIG. 2B, the user may select one of four resolutions as a property of the respective images, and each screen image shows a corresponding programming attribute of the multiplexed broadcast programs based on a different image property of a single primary broadcast program. The differing image properties may include respective image qualities such as may be determined by resolution, frame size, etc. or may include respective characteristics of a predetermined formatting or color component, where for example the MMS broadcaster chooses to broadcast a reformatted or colorized version of an old movie together with the original version. In FIG. 2C, the user may select one of four episodes of a particular serial, miniseries, syndicated program, etc., and each screen image shows a corresponding programming attribute (i.e., a specific episode) of the multiplexed broadcast programs. In the example of FIG. 2C, the primary broadcast program is essentially a combination of all the episodes. Also, although not specifically shown, the different programming attributes of the present invention may include various data displays, such as sports statistics updated in real time or cast member bios corresponding to scene changes.

In each instance, the respective programming attributes are prepared by the broadcasting station, i.e., the transmitter side, and are then transmitted to a receiver side via multiple (e.g., four) different virtual channels for the multi-mode service, and more particularly, via logical channels, e.g., channels 11-1, 11-2, 11-3, and 11-4. For example, a primary broadcast program may be entirely recorded using multiple cameras; a single (primary) broadcast program may be converted to more than one broadcast program of varying image qualities; or multiple episodes of a single series of broadcast programs may be transmitted simultaneously.

Figure 3:
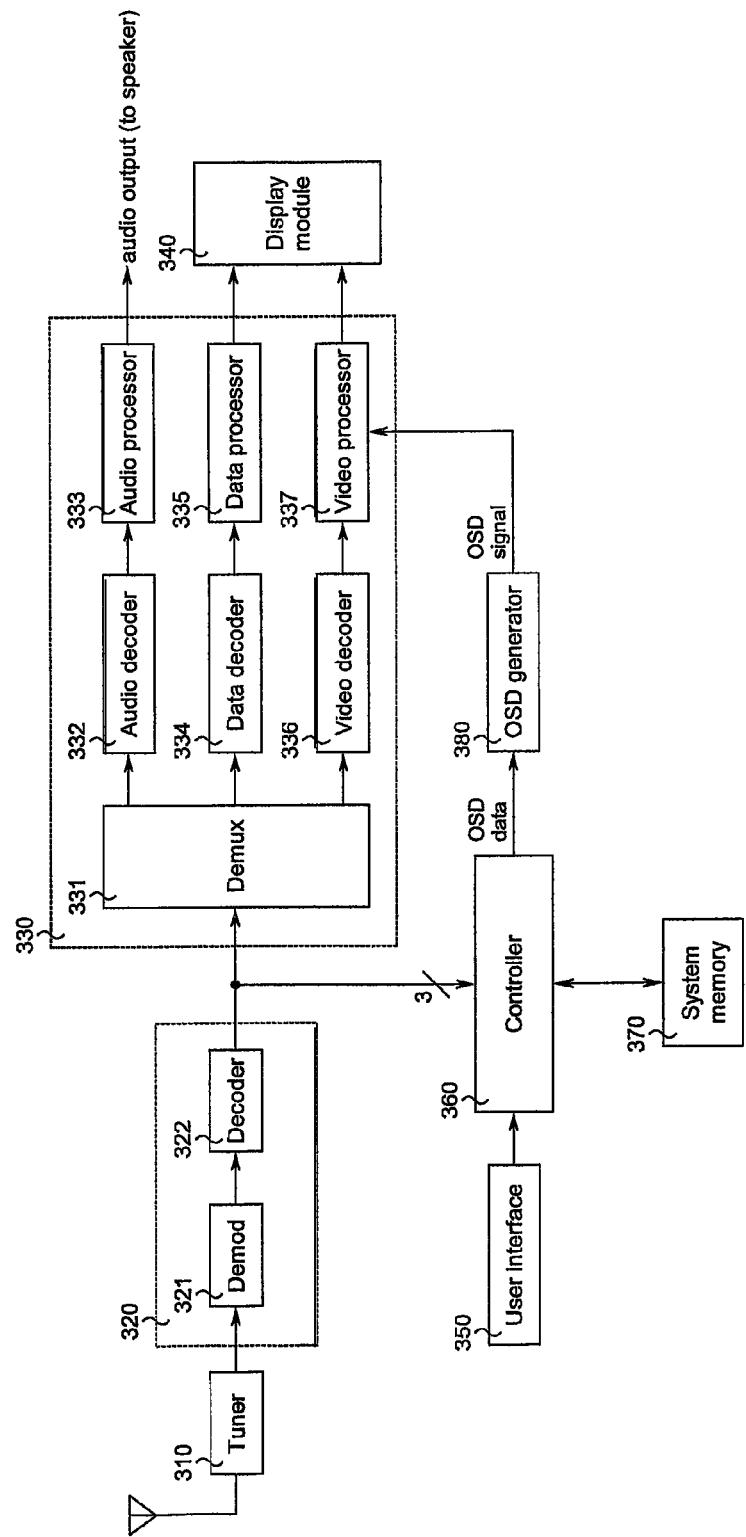
FIG. 3 is a block diagram of a digital television receiver according to the present invention.

Referring to FIG. 3, a digital television receiver according to the present invention includes a tuner 310 for receiving the transport stream (a digital broadcast signal) of a corresponding broadcast channel; a digital broadcast signal processing unit 320 for processing (decoding) the received transport stream; a digital broadcast signal outputting unit 330 for separating an output signal from the signal processing unit into audio, video, and data streams, respectively, where the audio stream may include a separate audio signal for each the video and data streams, and for converting the separated streams to audible/displayable signals; a display module 340 such as an LCD, PDP, or CRT module including a screen for displaying (outputting) the output signals from the signal outputting unit; and a user interface 350 such as a remote controller, key input pad, or touch screen for providing a user input to a controller 360, which controls the television receiver overall based on a system program stored a system memory 370, which receives the decoded transport streams from the signal processing unit, and which outputs on-screen display (OSD) data to an OSD generator 380 for generating an OSD signal under the control of the controller and for providing the generated OSD signal to the signal outputting unit.

The controller 360 is operatively connected to each of the above elements to control the television receiver overall. For example, though not specifically shown, the controller 360 drives the tuner 310 to receive a digital broadcast signal of a specific physical channel according to a channel selection made by a user (i.e., a viewer) of the television receiver. The controller 360 may also provide a control signal for selectively outputting the audio signal corresponding to the video or data stream and may be connected to the display module 340 as necessary.

According to the present invention, the controller 360 extracts side information (e.g., PSI or PSIP data) from the received and decoded transport stream, to determine whether a flag indicating a multi-mode service is present in the side information. If presence of the MMS flag is detected, MMS information including an icon, i.e., an "MMS" icon, is displayed on a screen of the currently selected channel to notify the user that the received transport stream corresponds to a broadcast channel for the multi-mode service, that is, an MMS broadcast channel, and that a plurality of logical channels exist within the received transport stream. The side information extracted from the currently received transport stream is also used by the controller 360 to determine how many logical channels are present and are being received and to provide the user with an indication of the corresponding programming attributes. Subsequently, the controller 360 generates a representative image (e.g., a thumbnail or sample moving picture) of each of the logical channels and stores the generated representative images in the memory 370. The stored representative images are later used to provide the user with a preview of the content of the logical channels, and particularly with a preview of content currently being broadcasted on all corresponding logical channels.

The digital broadcast signal processing unit 320 includes a demodulator 321 and a decoder 322. The demodulator 321 demodulates the transport stream provided by the tuner 310. The decoder 322 decodes the demodulated transport stream into an audio stream, a video stream, and a data stream and provides the streams to the broadcast signal outputting unit 330 and to the controller 360 so that the side information may be extracted for a currently selected channel and so that the representative images may be generated based on the currently selected channel.

The digital broadcast signal outputting unit 330 includes a demultiplexer 331, an audio decoder 332, an audio processor 333, a data decoder 334, a data processor 335, a video decoder 336, and a video processor 337. The demultiplexer 331 separates the audio, video, and data streams outputted from the digital broadcast signal processing unit 320 from each other and outputs the separated streams to the audio decoder 332, data decoder 334, and video decoder 336, respectively, and the separated streams are respectively decoded by the audio, data, and video decoders. Meanwhile, the audio processor 333 renders the decoded audio signal for output to a speaker (not shown), and the data and video processors 335 and 337 respectively render the decoded data into displayable signals for output via the display module 340.

In accordance with a control signal from the controller 360, which is controlled according to selections made by the user via the user interface 350, the OSD generator 380 generates an OSD signal for the MMS icon and other MMS information (i.e., logical channel-specific information), an OSD signal enabling the user to select a program corresponding to each of the logical channels, and an OSD signal enabling the user to select either a logical channel skip function or a logical channel lock function. The OSD signals are provided to the video processor 337 of the digital broadcast signal outputting unit 330, and the video processor adds the corresponding OSD signal to the decoded video signal, so that the result can be displayed on the screen of the display module 340.

Under the control of the controller 360, the tuner 310 tunes to a broadcast channel signal among broadcast signals received as transport streams and then provides the transport stream corresponding to the tuned channel to the digital broadcast processing unit 320. Meanwhile, the television receiver according to the present so invention can receive such signals from various sources, including analog broadcast signal sources and external input signal sources. Although a single tuner (310) is shown in this embodiment, more than one such tuner may be employed. For example, although the present embodiment includes a single digital broadcast signal processing unit (320) and a single digital broadcast signal outputting unit (330), if two or more tuners are provided, a corresponding number of signal processing units and signal outputting units may be employed. By thus providing plural tuners, it is apparent to those skilled in the art that, by modifying the system program of the television receiver, multiple picture-in-picture (PIP) areas can be simultaneously displayed on the same screen, any of which may display a representative image of a logical channel or the received transport stream of a logical channel. Also, although a television broadcast receiver is taken as an example of a receiving side system, the present invention is applicable to other receivers such as a set-top box and the like.

Figure 4:
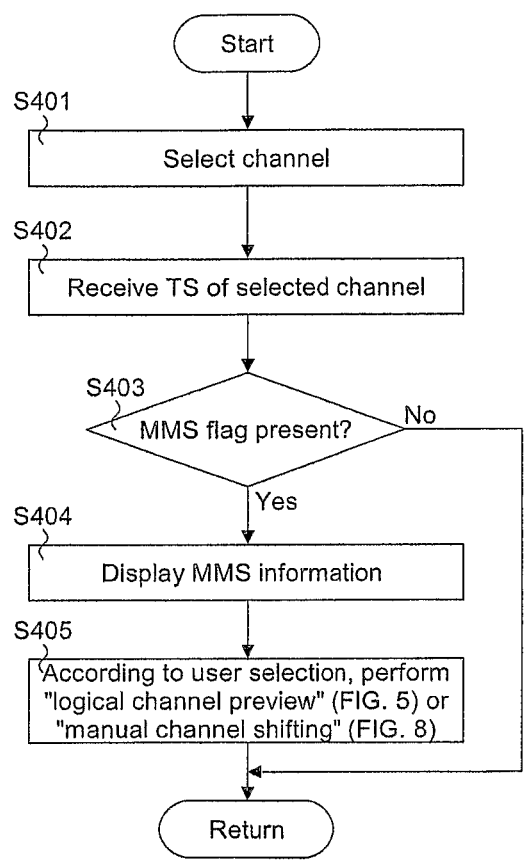
FIG. 4 is a flowchart of a main routine for processing an MMS broadcast channel in a television receiver according to the present invention.

Referring to FIG. 4, illustrating a main routine for processing an MMS broadcast channel in a television receiver according to the present invention, the controller 360 preferentially checks whether an input signal for channel selection is received from the user interface 350. According to the channel selection, a transport stream of the selected channel is received and decoded, to extract side information of the corresponding channel (S401, S402). Based on the extracted side information, the controller 360 determines whether an MMS flag is present in the received transport stream (S403). In this case, the MMS flag may be included in the side information, namely, in one or both of a virtual channel table (VCT) or an event information table (EIT).

If the presence of an MMS flag is detected, it is determined that the broadcast program of the channel of the steps S401 and S402 is part of an MMS broadcast signal, which is a multi-mode service using a single physical channel accompanied by a plurality of logical channels, and MMS information indicating this determination is displayed on the screen of the selected channel (S404). The displayed MMS information, which may include the logical channel-specific information, includes one or more of an icon (e.g., "MMS" symbol) indicating that the selected channel is an MMS broadcast channel and text-based indications of the total number (e.g., "3") of logical channels of the MMS broadcast channel and the different programming attributes of each logical channel, which may be displayed in correspondence to the logical channel number, e.g., 11-1, 11-2, etc. The MMS information may be provided as an OSD signal generated by the OSD generator 380 under the control of the controller 360, as in the below table.

| "MMS" icon |
| --- |
| Number of logical channels: 3 |
| 11-1: Bright screen |
| 11-2: Dark screen |
| 11-3: Sharp screen |

The displayed MMS information may include any or all of the above information and preferably includes at least the icon. Also, according to the generated OSD signal, any of the MMS information can be superposed on the image of the currently selected channel.

Subsequently, the user may, based on the displayed MMS information, decide to selectively perform an operation with respect to the currently selected channel. In doing so, the controller 360 determines whether the user wishes to perform manual channel shifting from the currently selected channel or whether the user wishes to request a content preview of all the logical channels of the currently selected channel and executes a corresponding routine accordingly (S405).

Figure 5:
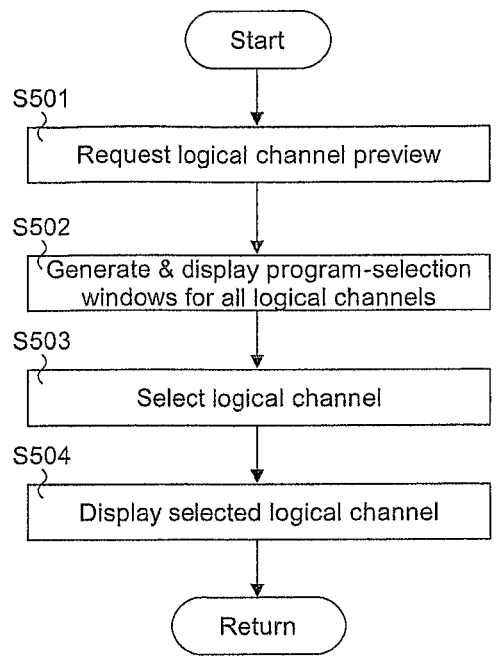
FIG. 5 is a flowchart of a logical channel preview routine according to the present invention.

Referring to FIG. 5, illustrating a logical channel preview routine according to the present invention, the controller 360 preferentially checks whether a request for logical channel preview is received from the user interface 350. Here, the request pertains to the logical channels commonly configured with the channel (i.e., a physical channel or a logical channel) of a current channel selection. In response to a logical channel preview request, the controller 360 generates a set of representative images corresponding to the logical channels, respectively, and controls the OSD generator 380 to display an arrangement of program windows enabling the user to select a program in correspondence to a logical channel (S501, S502). The generated representative images, which have been stored in the memory 370, are displayed in the program windows, respectively, for all logical channels belonging to the corresponding physical channel, that is, the physical channel selected at the time of the logical channel preview request. Hence, the user is able to select a specific logical channel while viewing representative images of all the logical channels (S503). In response to this selection, the currently displayed channel, which may be a physical channel or a logical channel, is switched to the selected logical channel, so that the broadcast program of the selected is logical channel may be decoded and the decoded image may be displayed on the whole screen (S504).

Figure 6:
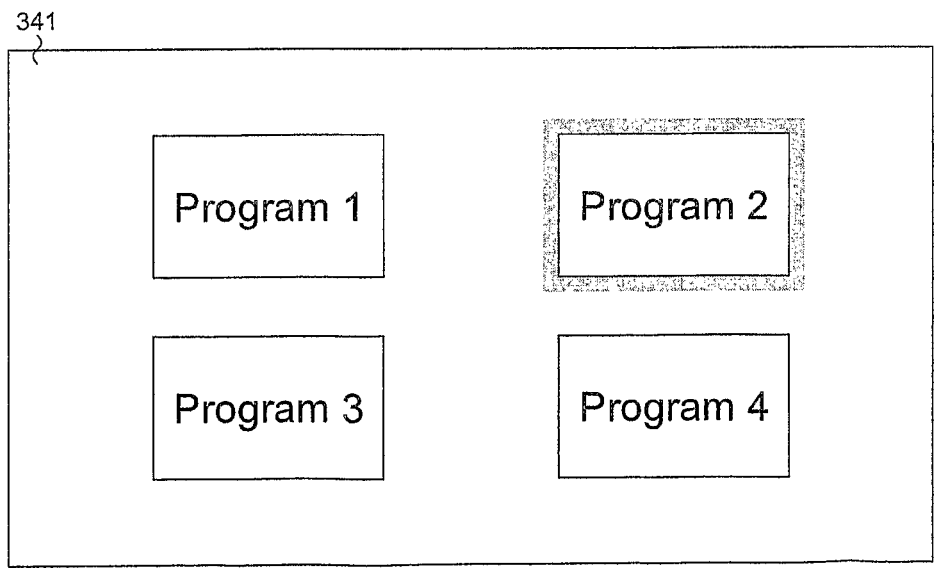
FIG. 6 is a diagram of an exemplary screen including an arrangement of program windows for displaying a plurality of programs corresponding to the logical channels belonging to the channel of a logical channel preview request.

FIG. 6 illustrates an exemplary screen including an arrangement of program windows for displaying a plurality of programs corresponding to the logical channels belonging to the channel of a logical channel preview request. That is, each program window corresponds to one logical channel. The program windows may be formed of PIP images by which the respective programs of the logical channels may be previewed in response to the logical channel preview request of FIG. 5. The PIP images are displayed on a screen 341 of the display module 340 and may be superposed on an image (broadcast program) of the currently selected channel, which may for example serve as a background image filling the area of the screen 341. Upon selection of a logical channel, the image of the selected logical channel may wholly replace the image of the currently selected channel and fill the screen area, preferably while removing the display of the program windows. Alternatively, the image of a currently selected (e.g., highlighted) logical channel may become a background image to the arrangement of the program windows.

To generate the display of FIG. 6 in response to a logical channel preview request, the controller 360 searches all the logical channels belonging to the currently selected channel, that is, the channel selected at the time of requesting the logical channel preview. A screen is then configured with representative images of the searched logical channels. The configured screen includes a GUI generated by the OSD generator 380 under the control of the controller 350, to enable a user selection of the broadcast program of a corresponding logical channel, for example, through the movement of a cursor highlighting the selected program window. As shown, a second program window (i.e., program 2) corresponding to a second logical channel (e.g., 11-2) is being selected by the user.

Figure 7:
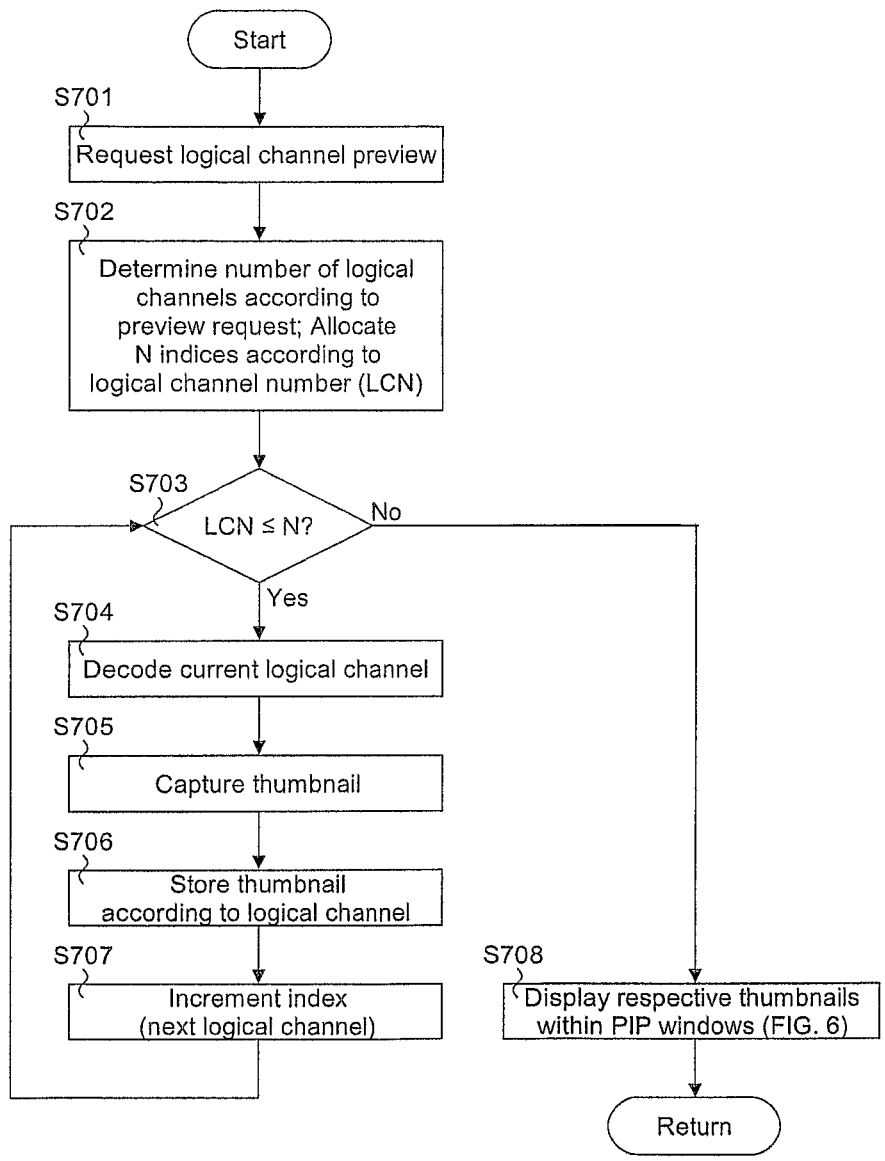
FIG. 7 is a flowchart of a routine for generating and displaying a representative image for each logical channel according to the present invention.

FIG. 7 illustrates a routine for generating and displaying a representative image for each logical channel. It should be appreciated that, in response to a request for previewing the logical channels commonly configured with the channel of a current channel selection, as in FIG. 5, the representative images of the step S502 must be obtained. The representative images, which may include a thumbnail or a sample moving picture, correspond to screen captures such as those of FIGS. 2A-2C.

Referring to FIG. 7, if the user inputs a signal for requesting a preview of the corresponding logical channels, the controller 360 determines the number of logical channels belonging to the physical channel corresponding to the preview request and then allocates N indices according to logical channel number or "LCN" (S701, S702). Thus, the value of N is equal to the total number of logical channels, while incrementing values for "LCN" indicate the respective logical channels, beginning from an initial value of "1" and increasing by "1" in correspondence to each logical channel. Then, beginning from a first logical channel (LCN=1), the corresponding logical channel number is repeatedly compared to N, proceeding until reaching the point where "LCN" equals the total number of logical channels (S703). For each instance of increasing "LCN," the current logical channel is decoded and a corresponding representative image is captured (S704, S705). Accordingly, for each logical channel of the multi-mode service, one captured representative image is stored according to its assigned index value (S706, S707). Upon completion of the entire process for generating and storing the representative images for every logical channel, each representative image may be displayed as a picture-in-picture (PIP) image, respectively, within a plurality of program windows, as shown in FIG. 6 (S708).

Figure 8:
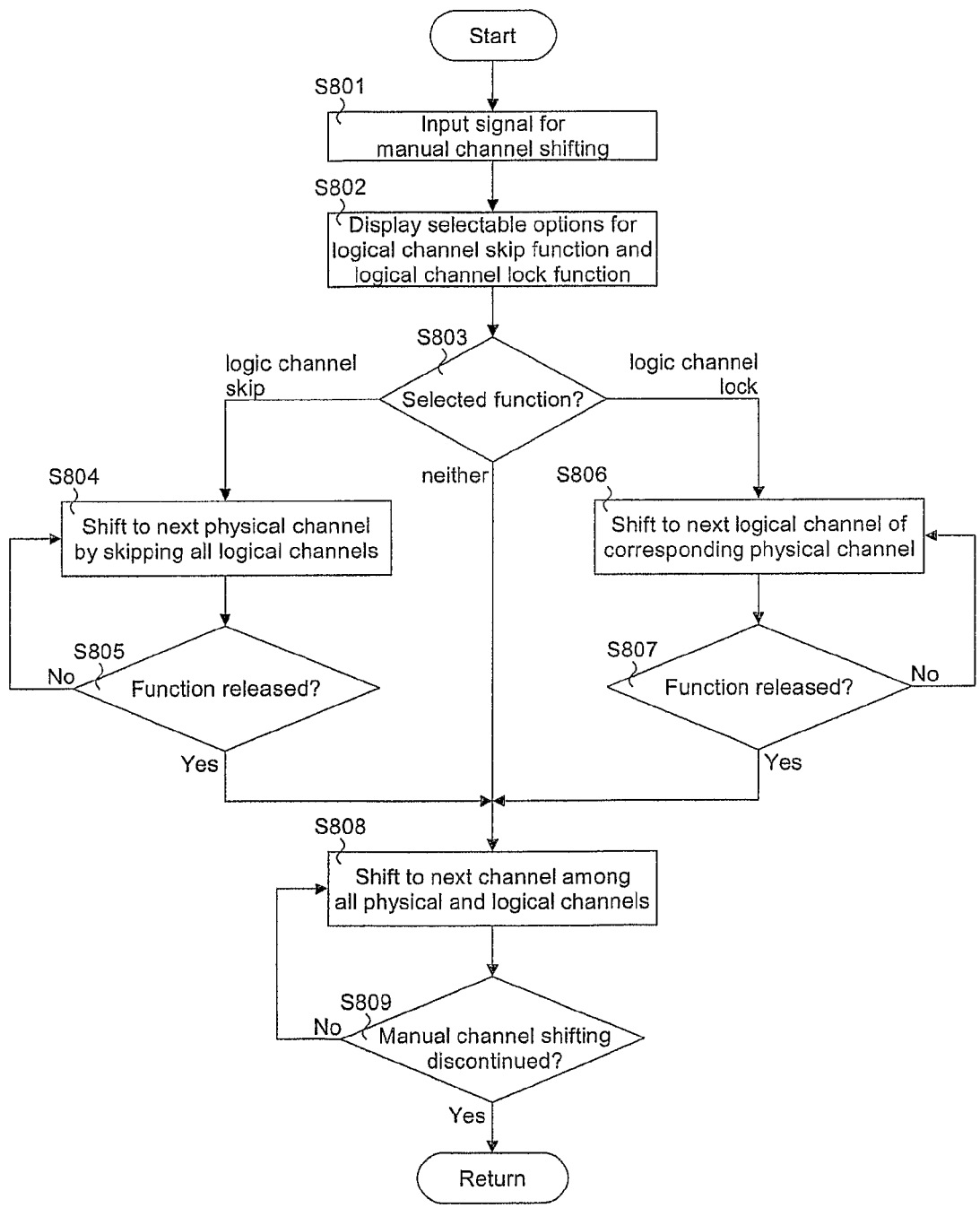
FIG. 8 is a flowchart of a manual channel shifting routine according to the present invention.

FIG. 8 illustrates a manual channel shifting routine according to the present invention, which may be performed according to a user selection in the step S405. That is, the controller 360 preferentially checks whether an input signal for manual channel shifting is received from the user interface 350, to determine whether the user intends to perform a manual channel shifting operation (S801). Typically, the input signal is a channel increment/decrement command such as that from a channel up/down key of a remote controller, to shift the selected channel by "1." Here, the channel increment/decrement command executes a tuner control operation, namely, the shifting of tuned channels performed for example after executing an automatic channel search function for setting a user preference of channels to be included in the manual channel shifting operation.

If it is determined that a manual channel shift key signal is initially input, whereby a user attempts to select a channel, a GUI including an icon and/or text and providing the user with selectable options may be displayed (superposed) on the current screen according to an OSD signal from the OSD generator 380 (S802). The displayed GUI enables the user to select a logical channel skip function, a logical channel lock function, or neither function, and the routine continues based on a determination of the selection (S803). Here, repeated operations corresponding to the step S801 may be performed at any time after the determination (checked results) of the step S803.

Thereafter, assuming a user selection of the logical channel skip function, in manual channel shifting to select a next channel, the selected channel shifts directly to the next physical channel while skipping the logical channels (S804). That is, the channel increment/decrement is performed within physical channels only. Meanwhile, the controller 360 determines whether the logical channel skip function is released, for example, by periodically checking an input from the user interface 350 to determine whether the user has released the function (S805). If so, manual channel shifting to select a next channel can be performed among all channels, that is, including the logical channels as well as the physical channels (as if neither function were selected).

On the other hand, assuming a user selection of the logical channel lock function, in manual channel shifting to select a next channel, the selected channel shifts through each logical channel belonging to the corresponding physical channel (S806). Therefore, typically, the logical channel lock function is used in case of attempting a manual channel shift while the currently selected channel is a logical channel. Meanwhile, the controller 360 determines whether the logical channel lock function is released, for example, by periodically checking an input from the user interface 350 to determine whether the user has released the function (S807). If so, manual channel shifting to select a next channel can be performed among all channels, that is, including all physical channels as well as any logical channels (as if neither function were selected).

Meanwhile, if the user selects neither the logical channel skip function nor the logical channel lock function, manual channel shifting to select a next channel is performed among all channels, that is, including both physical and logical channels (S808). That is, if it is determined that no manual channel shift key signal is input for a predetermined period of time, for example, by periodically checking an input from the is user interface 350 to determine whether there is a continuation of manual channel shifting (S809), it is determined that the user intends to cease the operation, whereby the controller 360 ends the routine.

INDUSTRIAL APPLICABILITY

Firstly, by adopting the present invention, a multi-mode service (MMS) broadcast channel system, which is capable of simultaneously transmitting multiple associated-content programs on a single physical channel together with corresponding logical channels, enables a user to select from various programming attributes, to provide a very active viewing environment in accordance with the user's preference and thereby increase viewer satisfaction. Secondly, information on the multiple associated-content programs having various different programming attributes for a single primary broadcast program can be provided for any selected MMS broadcast channel. Thirdly, a channel having a specific programming attribute can be efficiently selected when viewing programs on an MMS broadcast channel, by referencing the content currently being broadcasted on all the logical channels.

While the present invention has been described and illustrated herein with reference to one or more preferred embodiments, it will be apparent to those skilled in the art that various modifications can be made in the present invention without departing from the spirit or scope of the invention. Thus, it is intended that the present invention covers such modifications provided they come within the scope of the appended claims and their equivalents.

What is claimed is:

1. A method of processing a multi-mode service (MMS) broadcast signal in a digital television receiver, the method comprising:
    receiving a transport stream corresponding to a selected channel;
    extracting side information from the received transport stream;
    determining, based on the extracted side information, whether the selected channel is an MMS broadcast channel broadcasting a primary broadcast program, the MMS broadcast channel including a single physical channel accompanied by a plurality of logical channels configured with the single physical channel, each logical channel transmitting a different programming attribute of the primary broadcast program; and
    displaying information on the plurality of logical channels, if it is determined that the selected channel is an MMS broadcast channel.

2. The method of claim 1, wherein the displayed information includes MMS information indicating that the selected channel is an MMS broadcast channel.

3. The method of claim 2, further comprising:
    displaying an image of the selected channel on a whole screen,
    wherein the MMS information includes an icon superposed on the displayed image according to an on-screen display (OSD) signal.

4. The method of claim 3, wherein the MMS information further includes text information describing the configuration of the logical channels.

5. The method of claim 3, wherein the MMS information further includes text information describing the different programming attributes of the primary broadcast program.

6. The method of claim 2, wherein the MMS information is included in at is least one of an event information table (EIT) and in a virtual channel table (VCT).

7. The method of claim 1, wherein the displayed information includes at least one selected from the group consisting of an icon indicating that the selected channel is an MMS broadcast channel, a total number of logical channels of the MMS broadcast channel, a number indicating the corresponding logical channel of the plurality of logical channels, and a description of the different programming attributes according to logical channel.

8. The method of claim 7, the logical channel preview routine comprising:
    displaying a plurality of program windows in correspondence to each logic channel, each program window including a representative image of each logical channel, the plurality of program windows enabling a user selection of one of the logical channels; and
    decoding, in response to the user selection, an image of the selected logical channel.

9. The method of claim 8, wherein the program windows are displayed on a current screen corresponding to the channel of the logical channel preview request and wherein, in response to the user selection, the decoded image is displayed on a whole screen by replacing the display of the current screen.

10. The method of claim 8, wherein each representative image includes one of a thumbnail and a sample moving picture.

11. The method of claim 1, wherein the logical channels are configured by assigning a different programming attribute of the primary broadcast program to each logical channel of the plurality of logical channels.

12. The method of claim 11, wherein the different programming attributes include a plurality of different camera sources of the primary broadest program.

13. The method of claim 11, wherein the different programming attributes include a plurality of different image properties of the primary broadest program.

14. The method of claim 11, wherein the different programming attributes include a plurality of different episodes of the primary broadest program.

15. The method of claim 1, further comprising:
preferentially checking whether a logical channel preview request is received from a user, the logical channel preview request corresponding to the selected channel; and
performing, in response to the logical channel preview request, a logical channel preview routine for providing the user with a preview of content carried by the logical channels of the selected channel.

16. The method of claim 1, further comprising:
preferentially checking whether a user inputs a manual channel shift key signal for performing a manual channel shifting operation with respect to a currently selected channel; and
performing, in response to the manual channel shift key signal, a manual channel shifting routine for selecting a next channel based on the currently selected channel.

17. The method of claim 16, further comprising:
displaying, in response to the manual channel shift key signal, an on-screen display (OSD) screen enabling a user selection of one of a logical channel skip function, a logical channel lock function, and neither function,
wherein, when performing the manual channel shifting operation, the logical channel skip function determines a selection of the next channel by skipping all logical channels and the logical channel lock function determines a selection of the next channel by shifting through each logical channel belonging to the physical channel of the currently selected channel.

18. The method of claim 17, further comprising:
releasing the user selection of the logical channel skip function; and
performing the manual channel shifting operation by selecting the next channel from among all logical channels and all physical channels.

19. The method of claim 17, further comprising:
releasing the user selection of the logical channel lock function; and
performing the manual channel shifting operation by selecting the next channel from among all logical channels and all physical channels.

20. The method of claim 17, wherein, when performing the manual channel shifting operation for a user selection of neither function, the next channel is selected from among all logical channels and al physical channels.

21. The method of claim 1, wherein said side information extracting is performed in response to a channel selection by a user.

22. A digital television receiver comprising:
a tuner for receiving a transport stream corresponding to a selected channel;
a controller for extracting side information from the received transport stream and for determining, based on the extracted side information, whether the selected channel is an MMS broadcast channel broadcasting a primary broadcast program, the MMS broadcast channel including a single physical channel accompanied by a plurality of logical channels configured with the single physical channel, each logical channel transmitting a different programming attribute of the primary broadcast program; and
a display module for displaying information on the plurality of logical channels, if it is determined that the selected channel is an MMS broadcast channel.

23. A multi-mode service (MMS) broadcasting system comprising:
a transmitter side for providing a multi-mode service by multiplexing a television broadcast signal including a plurality of broadcast programs based on a primary broadcast program, each broadcast program of the plurality of broadcast programs exhibiting a different programming attribute, said transmitter side inserting into the multiplexed signal a predetermined flag indicating the multi-mode service and transmitting the multiplexed signal via an MMS broadcast channel including a single physical channel accompanied by a plurality of logical channels configured with the single physical channel, each logical channel carrying a corresponding one of the different programming attributes of the primary broadcast program; and
a receiver side for receiving the multiplexed signal, said receiver side comprising:
a tuner for receiving a transport stream corresponding to a selected channel;
a controller for extracting side information from the received transport stream and for determining, based on the extracted side information, whether the selected channel is a channel broadcasting a multi-mode service; and
a display module for displaying information on the plurality of logical channels, if it is determined that the selected channel is a channel broadcasting a multi-mode service.

* * * * *